US012516431B2

(12) United States Patent
Zargari et al.

(10) Patent No.: US 12,516,431 B2
(45) Date of Patent: Jan. 6, 2026

(54) CONTROL OF THE SOLID OXIDE ELECTROLYZER

(71) Applicant: Bloom Energy Corporation, San Jose, CA (US)

(72) Inventors: Ali Zargari, San Jose, CA (US); Ehsan Raoufat, San Jose, CA (US); Julio Luna, San Jose, CA (US); Alireza Saeedmanesh, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 17 days.

(21) Appl. No.: 18/155,154

(22) Filed: Jan. 17, 2023

(65) Prior Publication Data
US 2023/0323551 A1     Oct. 12, 2023

Related U.S. Application Data

(60) Provisional application No. 63/299,894, filed on Jan. 14, 2022, provisional application No. 63/299,890, filed on Jan. 14, 2022.

(51) Int. Cl.
| | | |
|---|---|---|
| C25B 15/00 | (2006.01) | |
| C25B 1/02 | (2006.01) | |
| C25B 1/042 | (2021.01) | |
| C25B 9/77 | (2021.01) | |
| C25B 15/025 | (2021.01) | |
| C25B 15/027 | (2021.01) | |
| C25B 15/08 | (2006.01) | |

(52) U.S. Cl.
CPC .............. *C25B 15/025* (2021.01); *C25B 1/02* (2013.01); *C25B 1/042* (2021.01); *C25B 9/77* (2021.01); *C25B 15/027* (2021.01); *C25B 15/087* (2021.01)

(58) Field of Classification Search
CPC ......... C25B 15/025; C25B 1/042; C25B 9/77; C25B 15/027; C25B 15/087; C25B 1/02
See application file for complete search history.

(56) References Cited

U.S. PATENT DOCUMENTS

| | | | | |
|---|---|---|---|---|
| 2016/0377342 A1* | 12/2016 | Mermelstein | ..... | H01M 8/04179 62/617 |
| 2017/0175277 A1* | 6/2017 | von Olshausen | ......... | C25B 9/05 |
| 2018/0131018 A1* | 5/2018 | Perry | ................ | H01M 8/04201 |

FOREIGN PATENT DOCUMENTS

| | | |
|---|---|---|
| EP | 4105360 A2 | 12/2022 |
| EP | 4186996 A1 | 5/2023 |

OTHER PUBLICATIONS

Search Report issued Jun. 19, 2023 in corresponding European Patent Application No. 23151735.0.
J.E. O'Brien et al., "A 25 KW high temperature electrolysis facility for flexible hydrogen production and system Integration studies", International Journal of Hydrogen Energy, Elsevier, Amsterdam, NL, vol. 45, No. 32, May 11, 2020, pp. 15796-15804, XP086164464, ISSN: 0360-3199, DOI: 10.1016/J.IJHYDENE.2020.04.074 [retrieved on May 11, 2020].

\* cited by examiner

*Primary Examiner* — Zulmariam Mendez
(74) *Attorney, Agent, or Firm* — THE MARBURY LAW GROUP PLLC

(57) ABSTRACT

A modular solid oxide electrolyzer cell (SOEC) system including a stack of electrolyzer cells configured to receive steam in combination with hydrogen, and a steam recycle outlet configured to recycle a portion of the steam.

15 Claims, 15 Drawing Sheets

200

300

500

CONTROL OF THE SOLID OXIDE ELECTROLYZER

FIELD

The embodiments of the present invention are generally directed toward electrolyzer systems including solid oxide electrolyzer cells (SOEC) and methods of operating the same.

BACKGROUND

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) may be referred to as the air electrode, and the SOFC anode (SOEC cathode) may be referred to as the fuel electrode. During SOEC mode, water in the fuel stream is reduced ($H_2O + 2e^- \rightarrow O^{2-} + H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY

Accordingly, the present invention is directed to a modular electrolyzer system that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. It is to be understood that both the foregoing general description and the following detailed description are examples, and are not restrictive of the invention as claimed.

Figure 1:
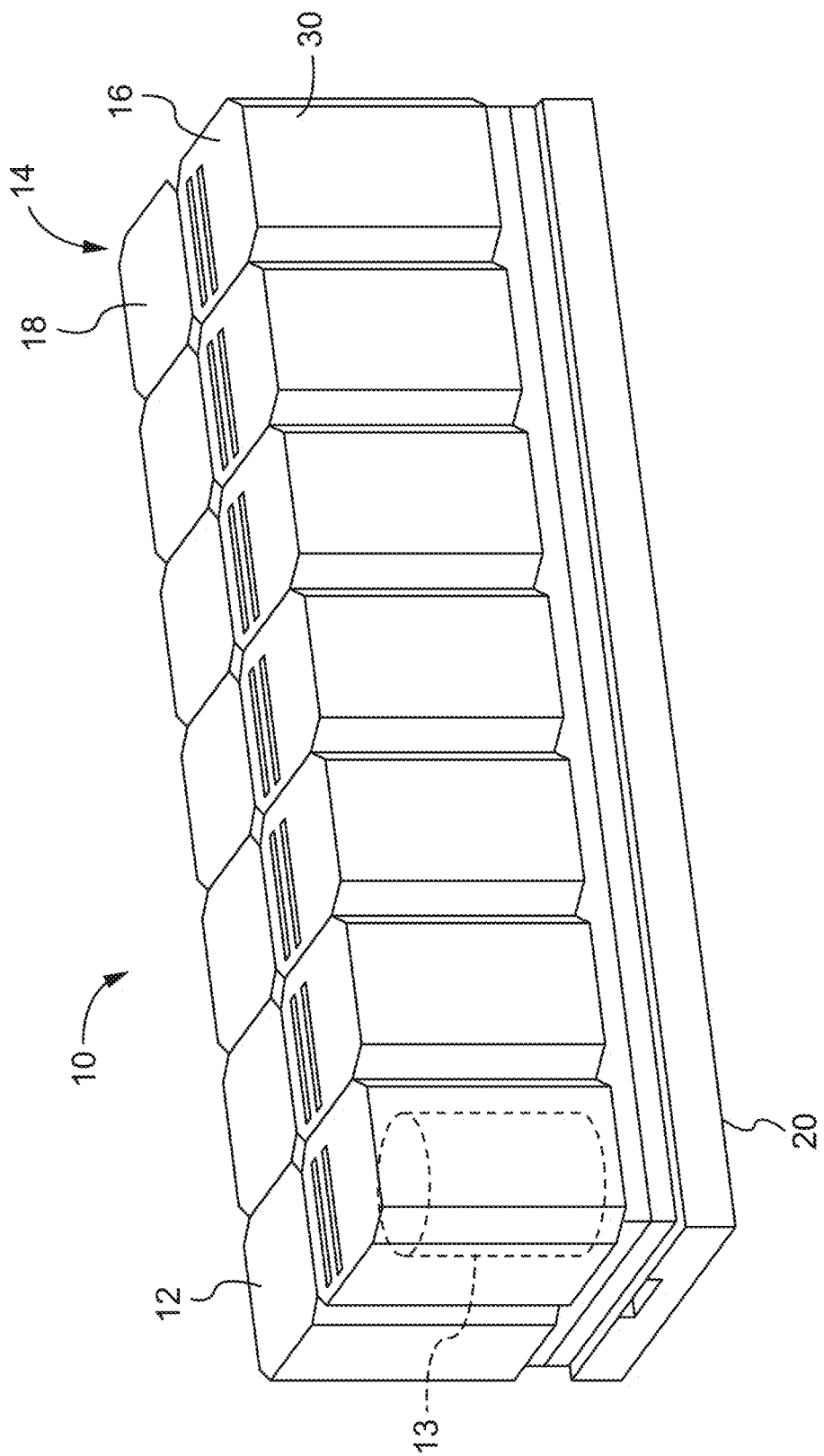
FIG. 1 illustrates a SOFC/SOEC modular system according to an example embodiment of the present invention.

FIG. 1 illustrates a SOFC/SOEC modular system 10 according to an example embodiment of the present invention.

The modular design of the SOFC/SOEC system 10 provides flexible system installation and operation. By contrast to prior modular systems, the embodiments use above ground routing for plumbing and electrical outing to increase the speed of installation and maintenance, and to reduce cost. In addition, the need of special tradespeople for installation is reduced. Modules allow scaling of installed generating capacity, reliable generation of power, flexibility of fuel processing, and flexibility of power output voltages and frequencies with a single design set. The modular design results in an "always on" unit with very high availability and reliability, and also provides an improved means of maintenance and scale-up. The modular design also enables the use of available fuels and required voltages and frequencies that may vary by customer and/or by geographic region.

The SOFC/SOEC modular system 10 includes a housing 14 in which at least one of generator modules 12 (preferably a plurality, generator module 12 also referred to as "SGM"), one or more fuel processing modules 16 (in SOFC systems), and one or more power conditioning modules 18 (i.e., electrical output, also referred to a generator module or "SPM") are disposed. In these example embodiments, the power conditioning modules 18 may include a mechanism to convert DC to AC or AC to DC. For example, the system 10 may include any desired number of modules, such as 2-30 generator modules, 3-12 generator modules, 6-12 modules, or other large site configuration of generator modules.

The example system 10 of FIG. 1 includes any number of generator modules 12 (one row of six modules stacked side to side), one fuel processing module 16 (in SOFC systems), and one power conditioning module 18 on a pad 20. The housing 14 may include a cabinet to house each module 12, 16, 18. Alternatively, modules 16 and 18 may be disposed in a single cabinet. While one row of generator modules 12 is shown, the system may include more than one row of modules 12. For example, the SOFC/SOEC system 10 may include two rows of generator modules 12 arranged back to back/end to end.

Each generator module 12 is configured to house one or more hot boxes 13. Each hot box contains one or more stacks or columns of fuel/eelectrolyzer cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. also may be used.

The fuel cell stacks may include externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processing module 16 and the power conditioning module 18 may be housed in one cabinet of the housing 14. As shown in the example embodiment in FIG. 1, one cabinet 14 is provided for one row of six (or any number of) generator modules 12, which are arranged linearly side to side on one side of the input/output module 14. The row of modules may be positioned, for example, adjacent to a building for which the system provides power (e.g., with the backs of the cabinets of the modules facing the building wall).

The linear array of generator modules 12 is readily scaled. For example, more or fewer generator modules 12 may be provided depending on the power needs of the building or other facility serviced by the fuel cell/electrolyzer system 10. The generator modules 12 and input/output modules 14 may also be provided in other ratios. For example, in other exemplary embodiments, more or fewer generator modules 12 may be provided adjacent to the input/output module 14. Further, the support functions could be served by more than one input/output module 14 (e.g., with a separate fuel processing module 16 and power conditioning module 18 cabinets). Additionally, the input/output module 14 is at the end of the row of generator modules 12, it also can be located in the center of a row generator modules 12 or other location.

The SOFC/SOEC modular system 10 may be configured in a way to ease servicing of the components of the system 10. For example, the routinely or high serviced components (such as the consumable components) may be placed in a single module to reduce amount of time required for the service person. For example, a purge gas (optional) may be placed in a single module (e.g., a fuel processing module 16 or a combined input/output module 14 cabinet). This can be the only module cabinet accessed during routine maintenance. Thus, each module 12, 14, 16, and 18 can be serviced, repaired or removed from the system without opening the other module cabinets and without servicing, repairing or removing the other modules. In addition, plumbing and electrical components may be disposed above a steel overlay disposed between the concrete pad and the generator modules 12.

For example, as described above, the system 10 can include multiple generator modules 12. When at least one generator module 12 is taken off line (i.e., no power is generated by the stacks in the hot box 13 in the off line module 12), the remaining generator modules 12, the fuel processing module 16 and the power conditioning module 18 (or the combined input/output module 14) are not taken off line. Furthermore, the fuel cell/electrolyzer system 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel/electrolyzer cell modular system 10 and/or serviced or repaired without stopping an operation of the other modules in the system, allowing the fuel cell system to continue to generate electricity. The entire SOFC/SOEC modular system 10 does not have to be shut down if one stack of fuel cells/electrolyzers in one hot box 13 malfunctions or is taken off line for servicing.

Figure 2:
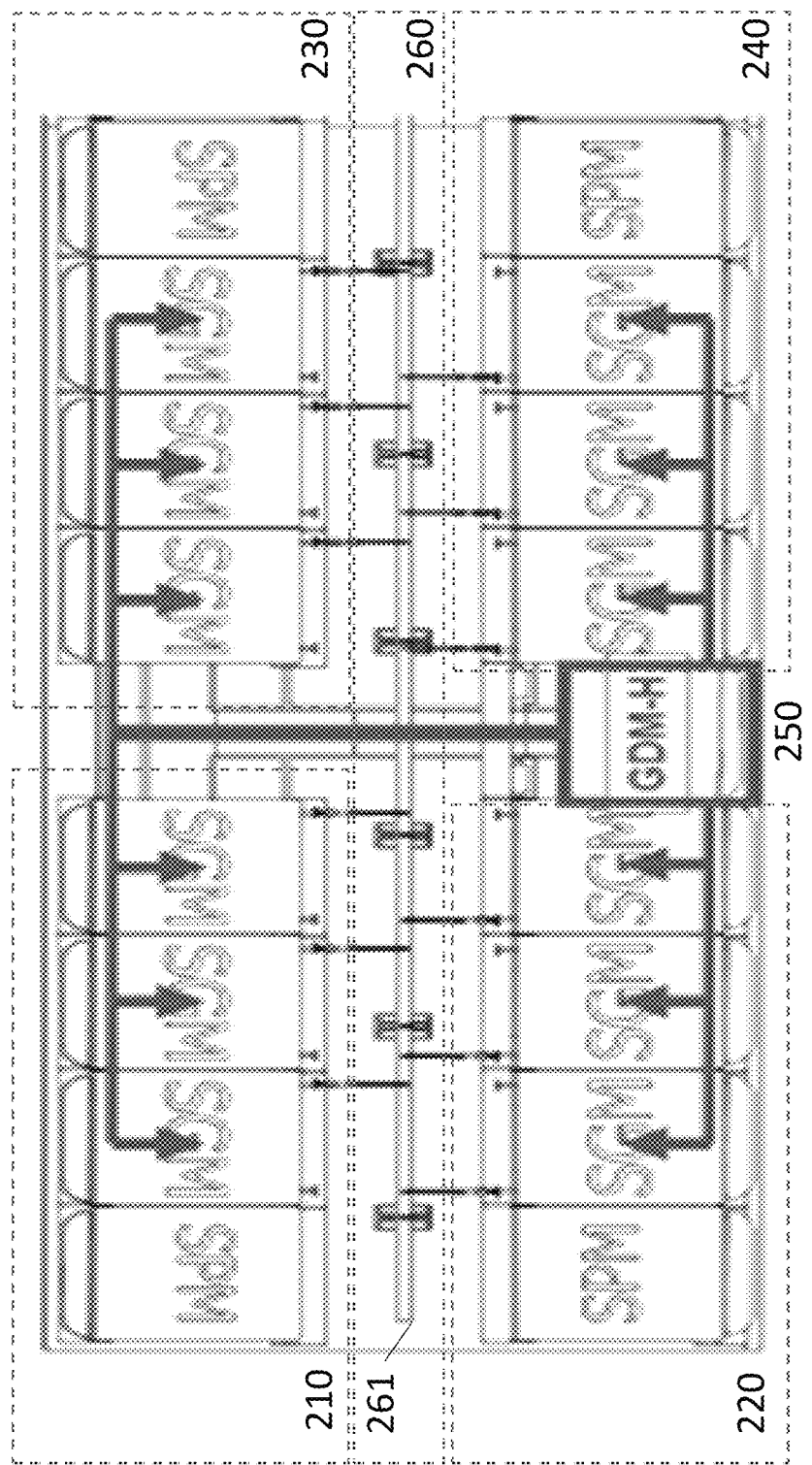
FIG. 2 illustrates a large site electrolyzer system according to an example embodiment of the present invention.

FIG. 2 illustrates a large site electrolyzer system 200 according to an example embodiment of the present invention.

The large-site electrolyzer system 200 includes a gas distribution module ("GDM") 250 that is configured to supply a plurality of modular blocks 210, 220, 230, 240 with start-up hydrogen. SOEC and SOFC systems generally require fresh hydrogen gas for start-up and shutdown. Gas distribution module 250 can further include a pressure detector, thermal detector, a gas safety shutoff, and a purge gas distributor.

As discussed above, each modular block incudes one power module ("SPM") and one or more generator modules ("SGM"), for example. A grouping of modular blocks into a collection of systems is referred to as a stamp. Thus, large site electrolyzer system 200 is a stamp. Because hydrogen is a flammable gas that is supplied to each SGM at pressure, a safe method of shutting off gas to a group of generator modules SGMs is needed if a safety event is detected. Thus, GDM 250 is configured to shut off hydrogen supplied to SGMs in the event that a safety event is detected. Safety designs, such as pressure detection, overpressure protection, and gas safety shutoff are readily applied within electrolyzer system 200 by GDM 250 and/or the fuel processing module (e.g., 16). In addition, a stamp level controller can be provided at GDM 250.

Although the grouping of four modular blocks 210, 220, 230, 240 is an example configuration, this configuration is an efficient grouping for gas safety. In addition, the grouping of four modular blocks 210, 220, 230, 240 is efficient for the collection of hydrogen product within servicing aisle 260. The piping 261 within servicing aisle 260 is configured to collect hydrogen product for integration with a downstream compression system. Piping 261 is configured to prevent condensate backflow into the generator modules SGMs. Condensate management also enables using various monitoring and control devices as well as piping to return to the water outlet (or BOP1).

Figure 3:
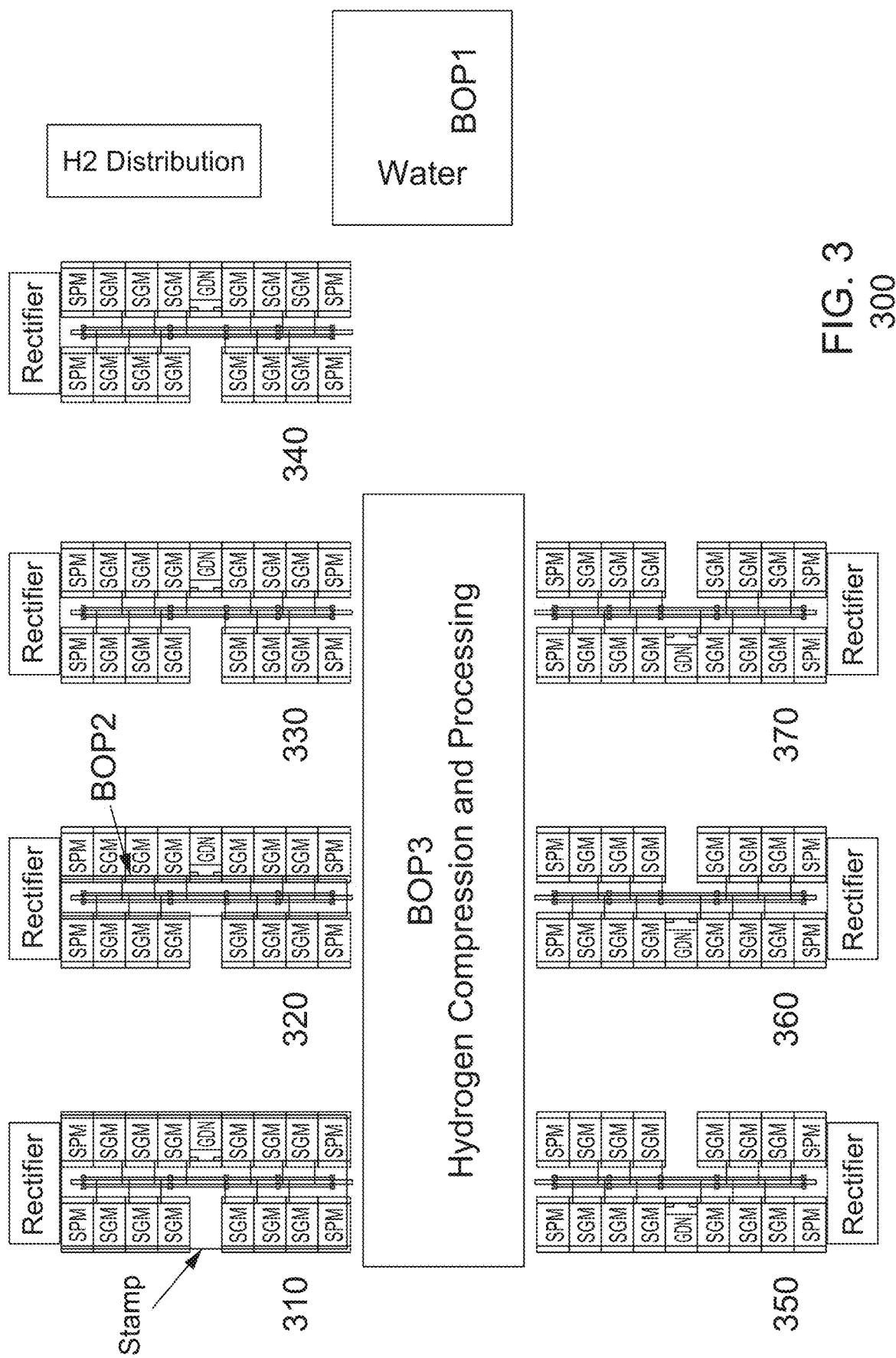
FIG. 3 illustrates a large site electrolyzer system according to another example embodiment of the present invention.
Figure 4A:
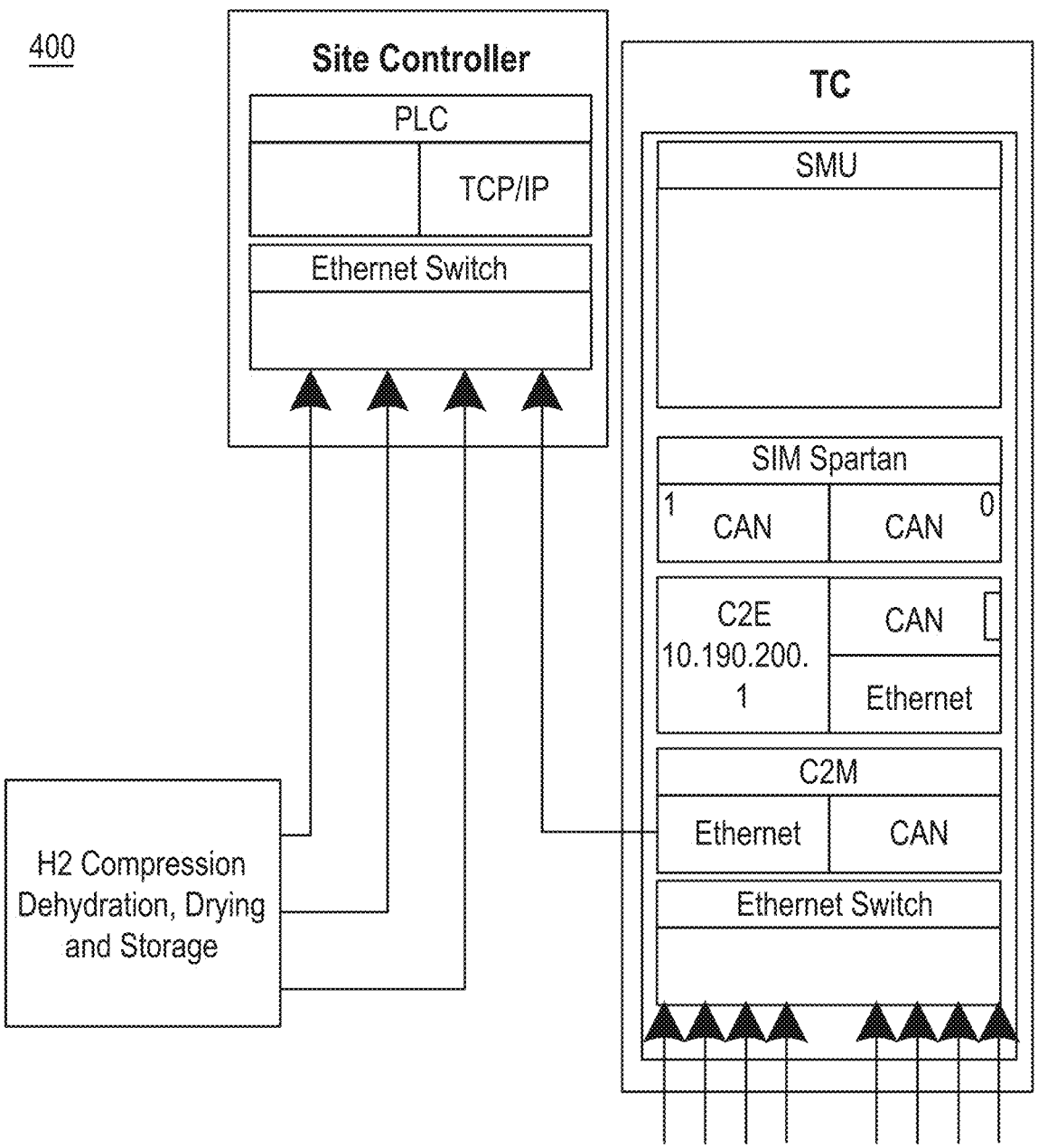
FIGS. 4A-4K illustrate a large site electrolyzer system according to an example embodiment of the present invention.
Figure 4B:
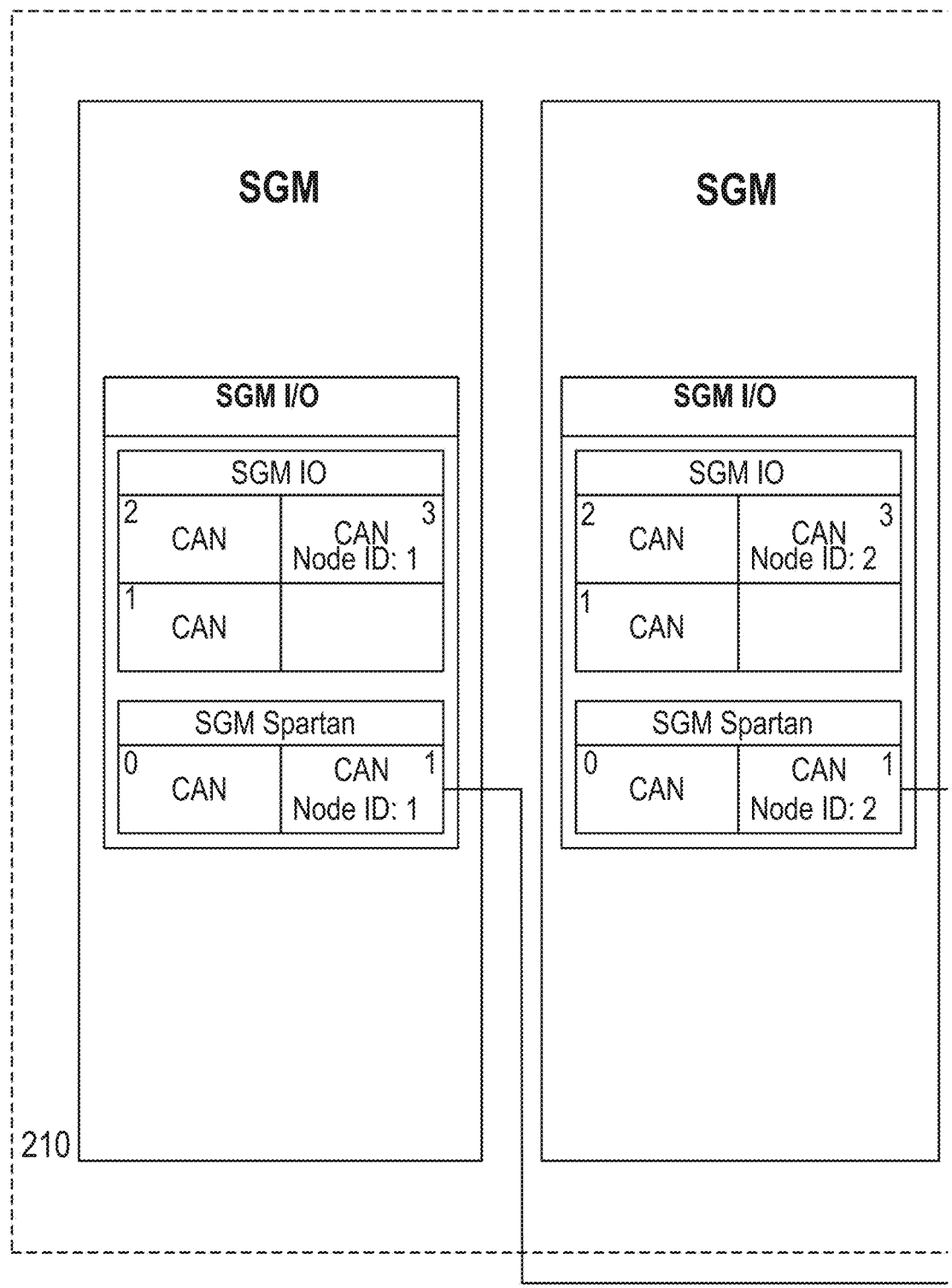
Figure 4C:
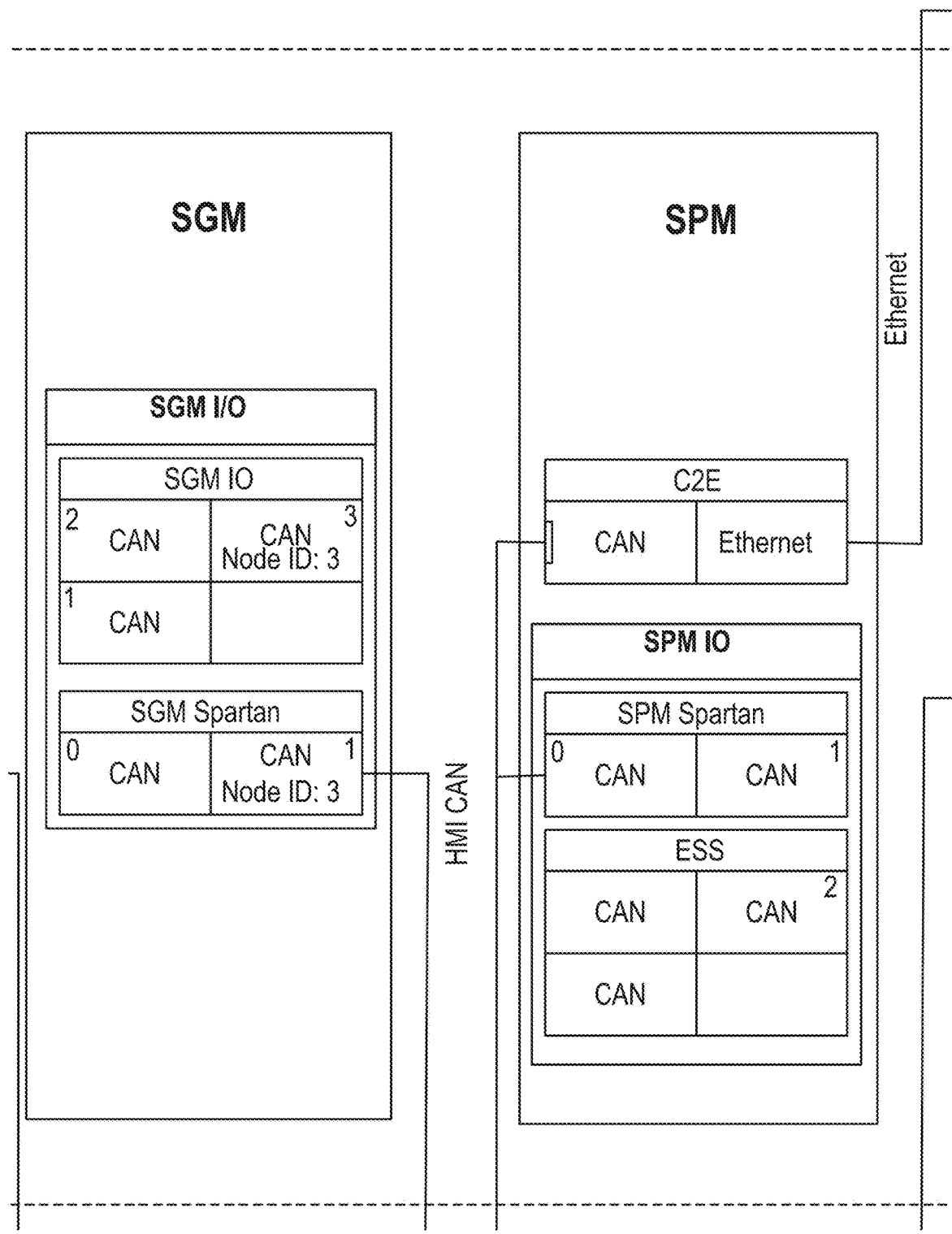
Figure 4D:
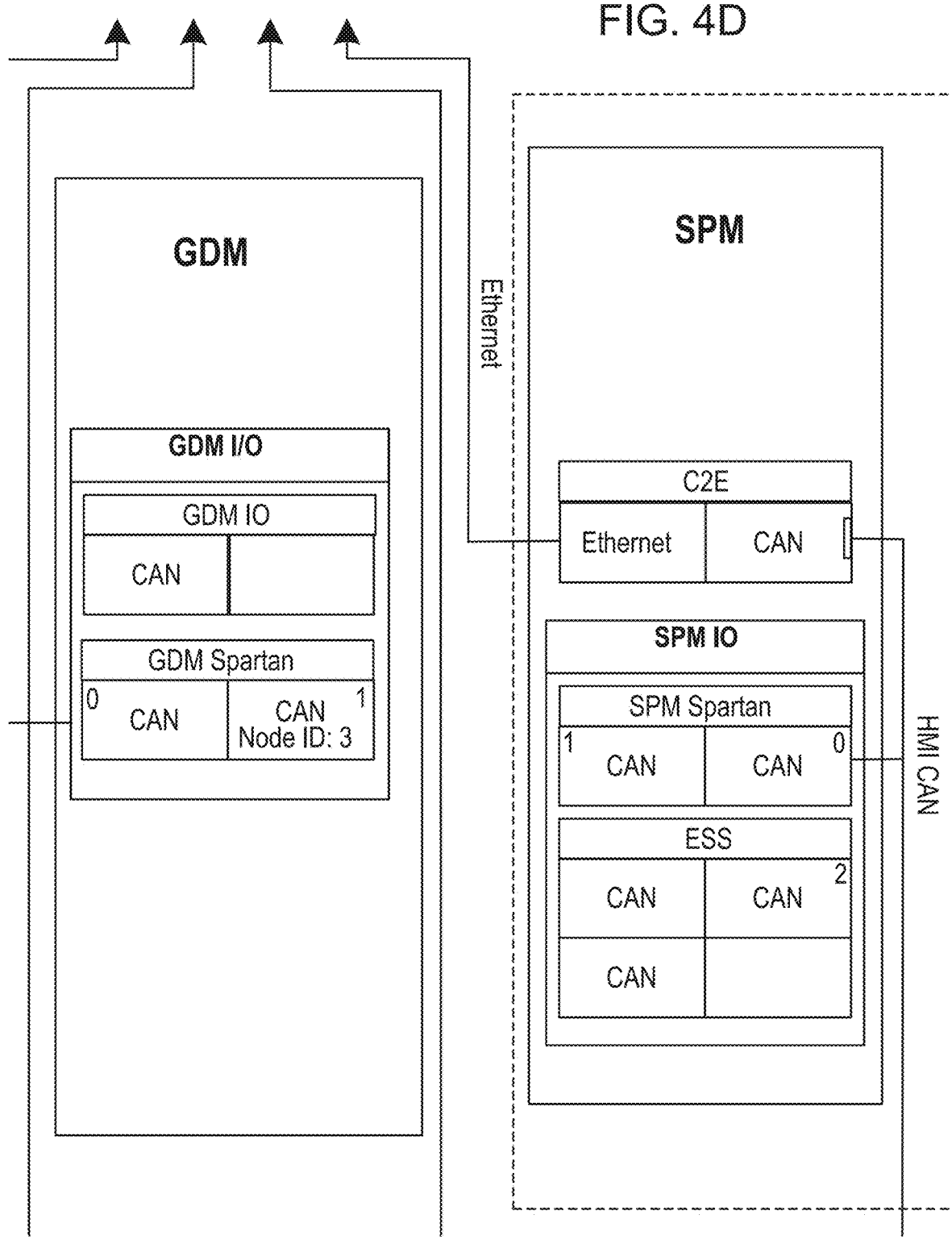
Figure 4E:
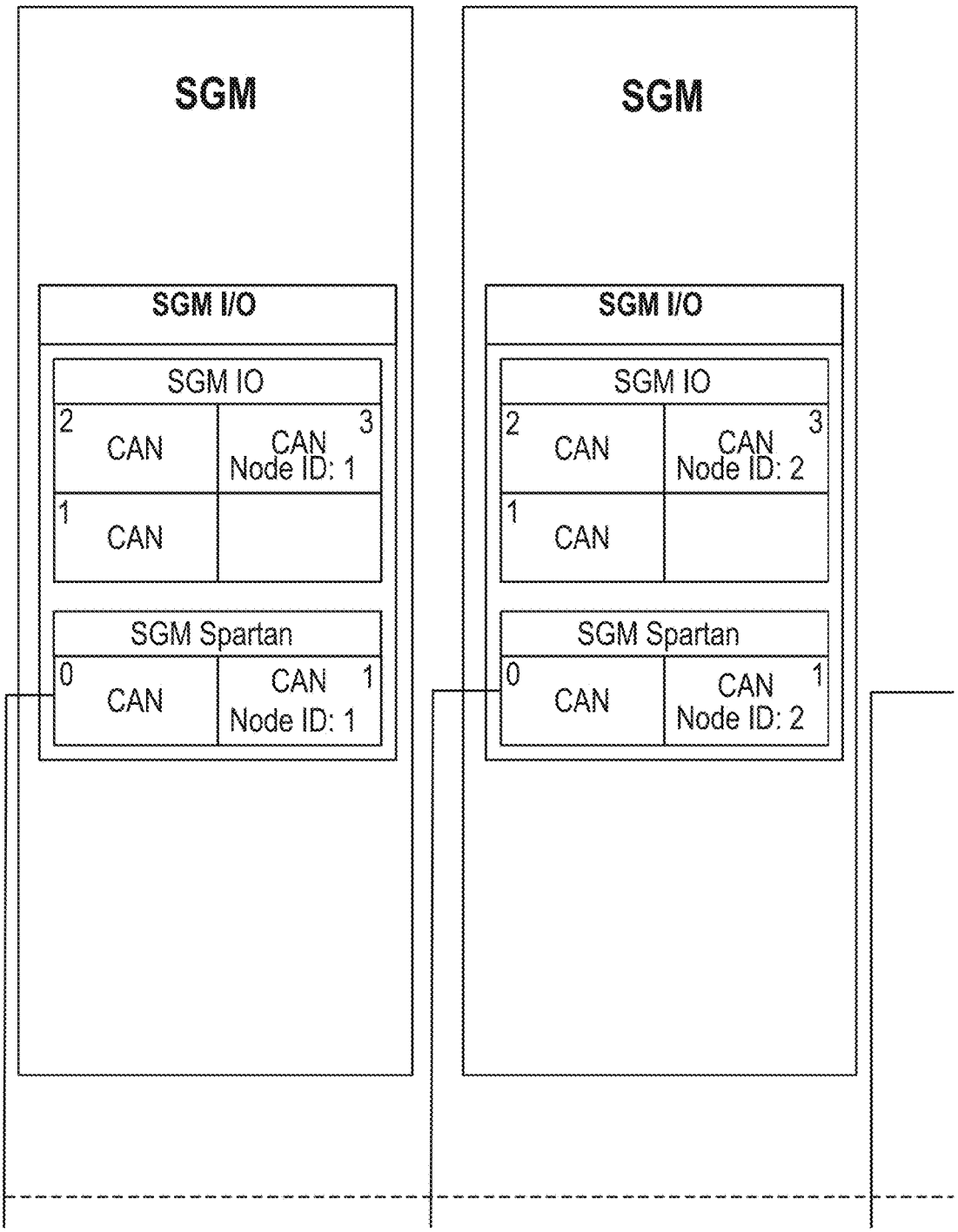
Figure 4F:
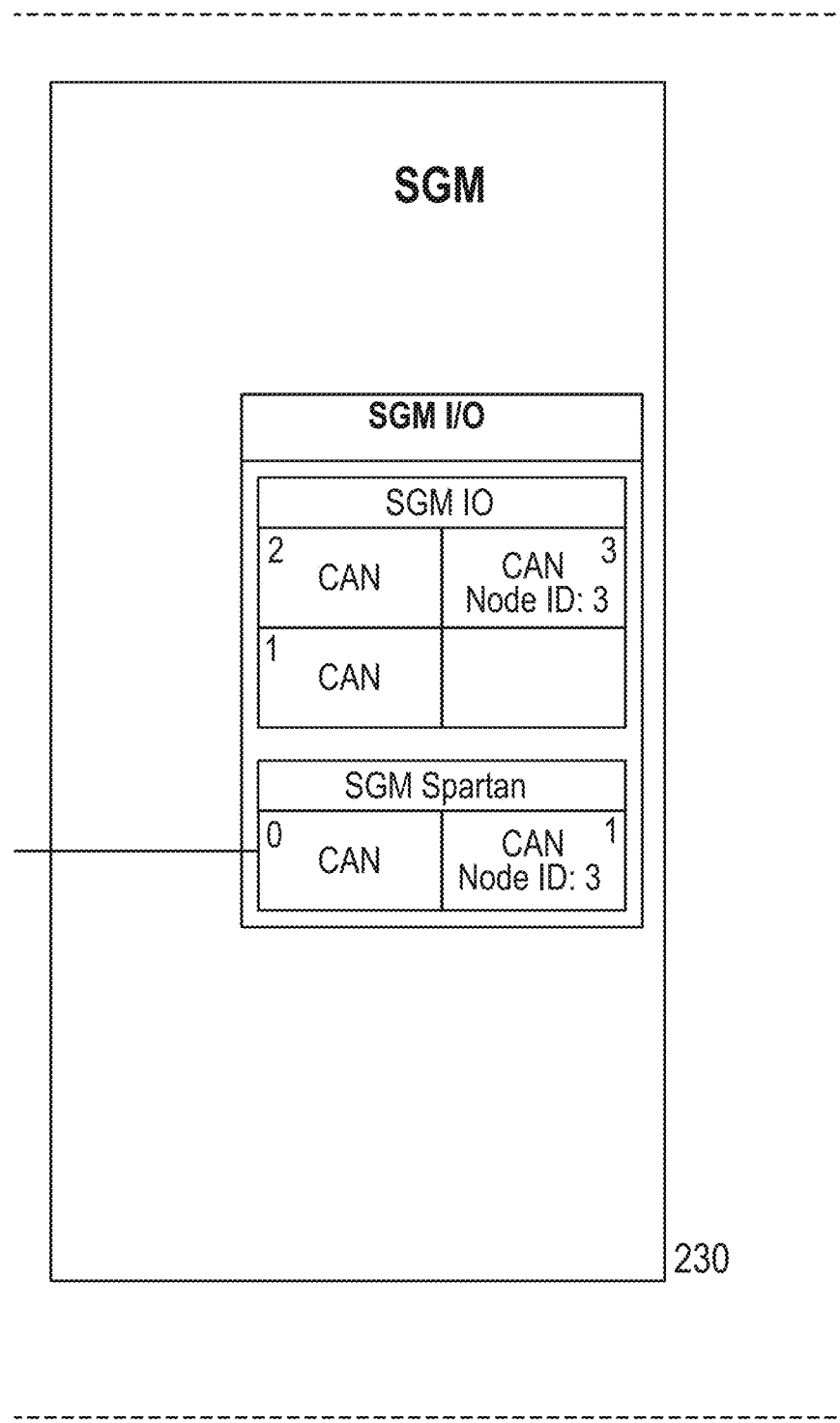
Figure 4G:
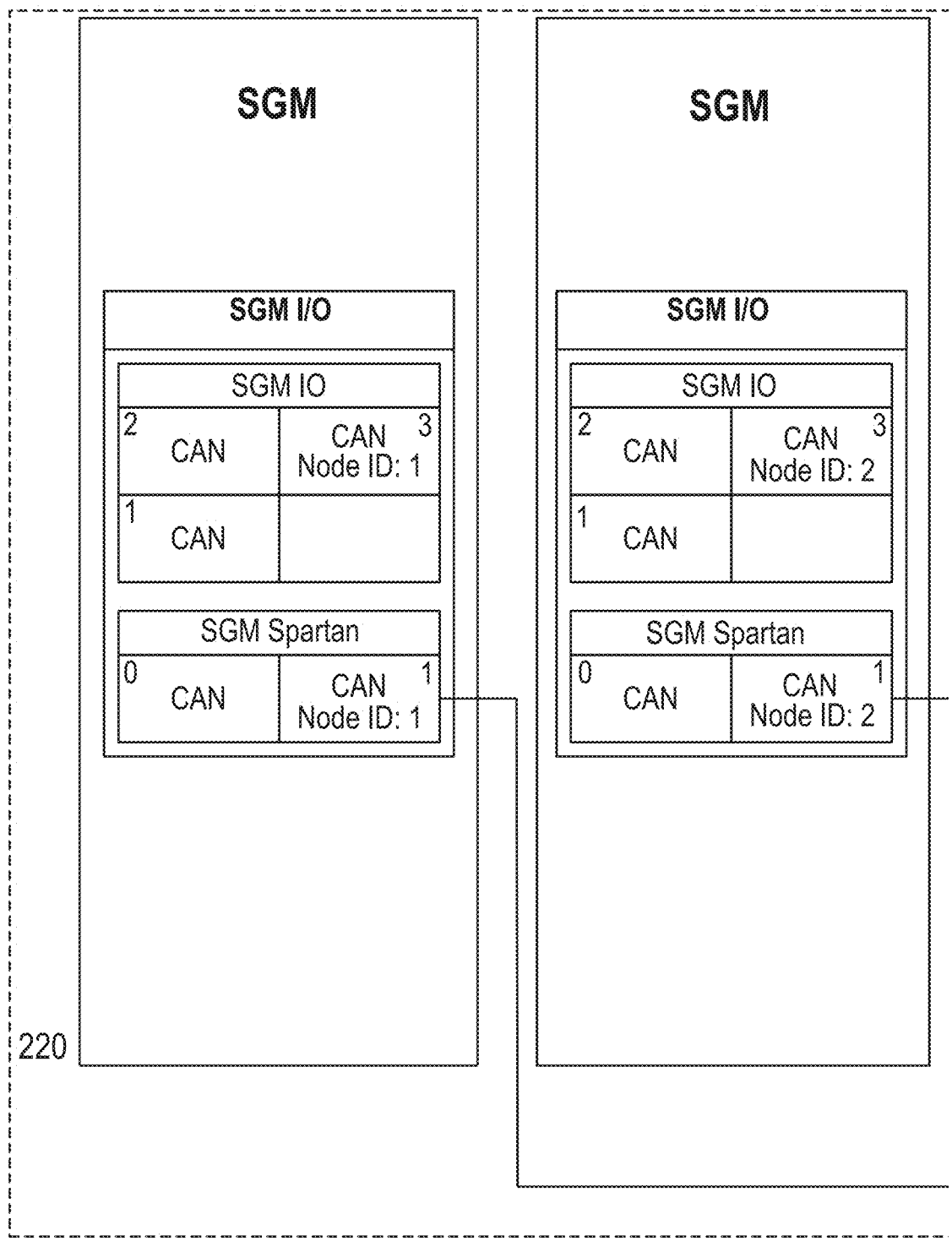
Figure 4H:
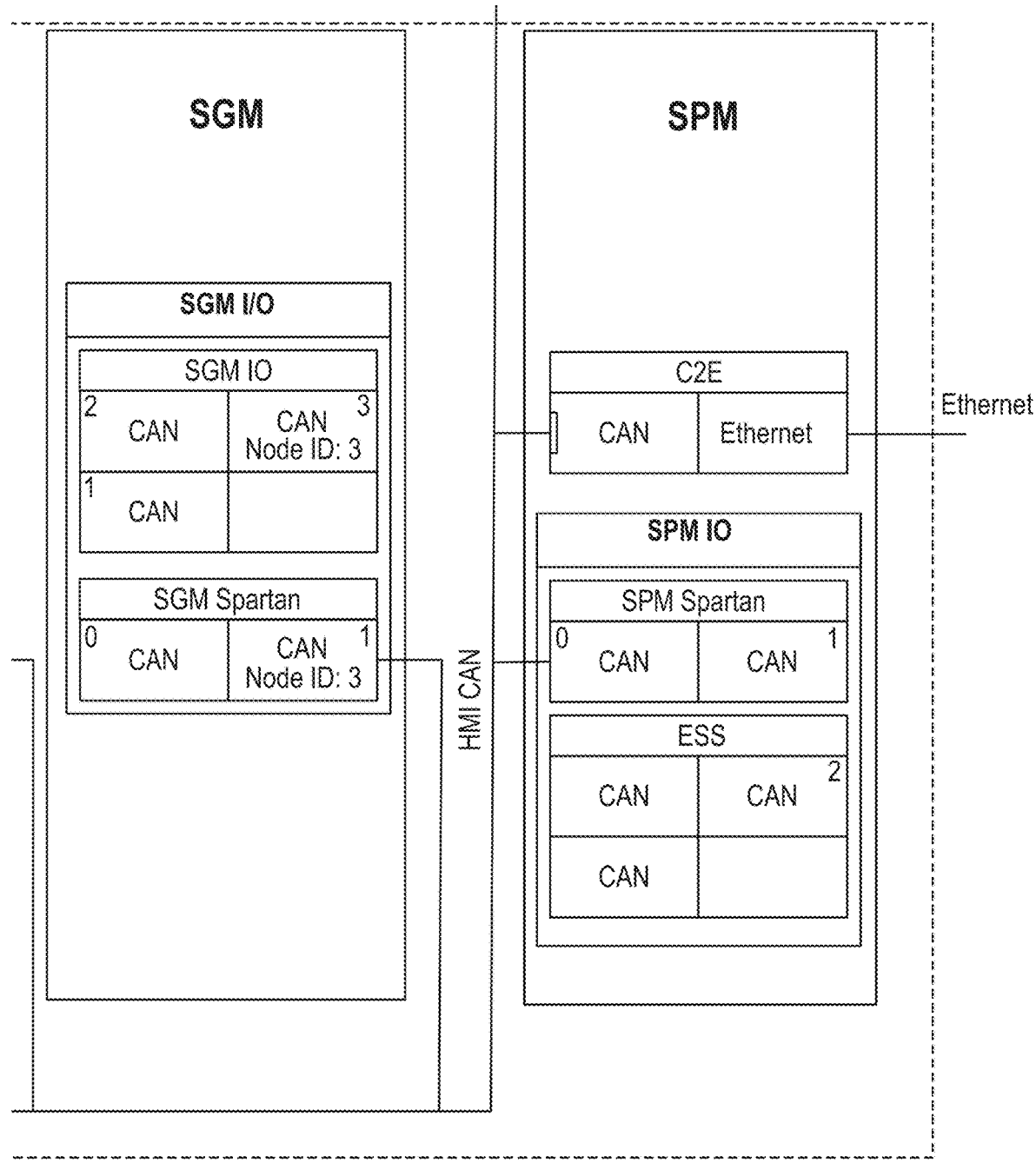
Figure 4I:
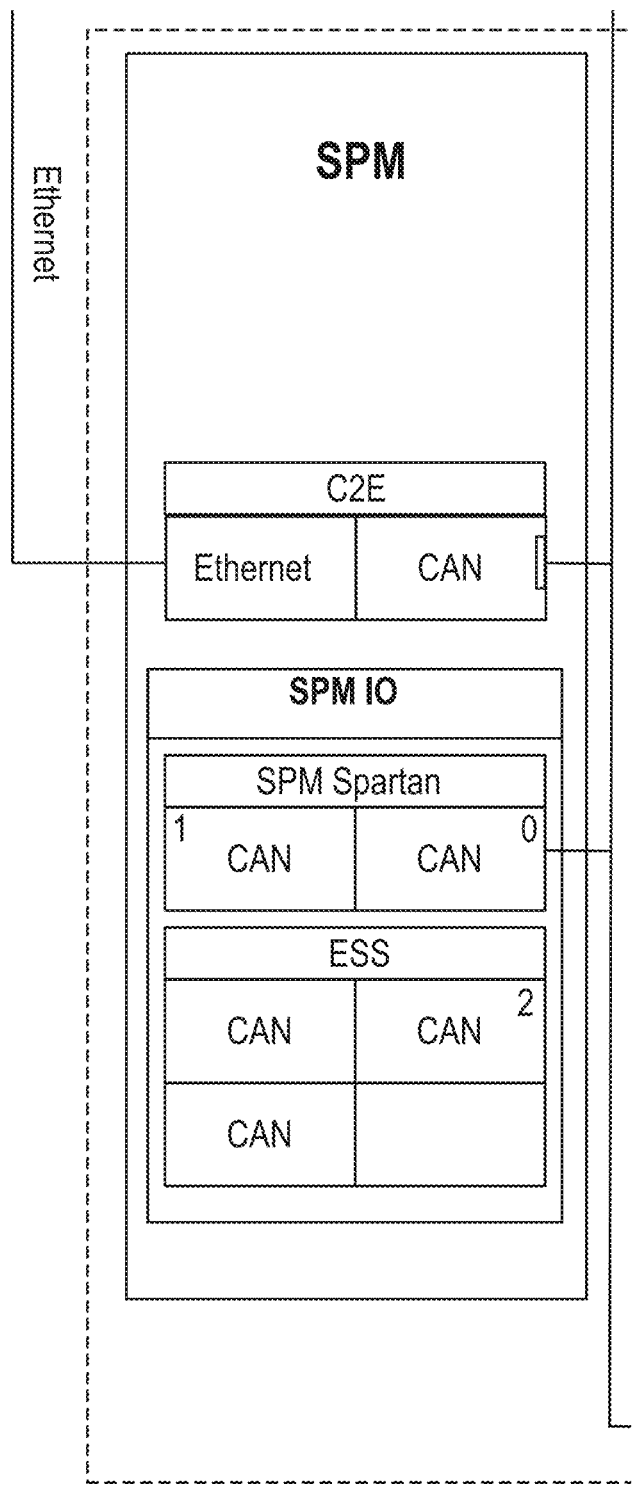
Figure 4J:
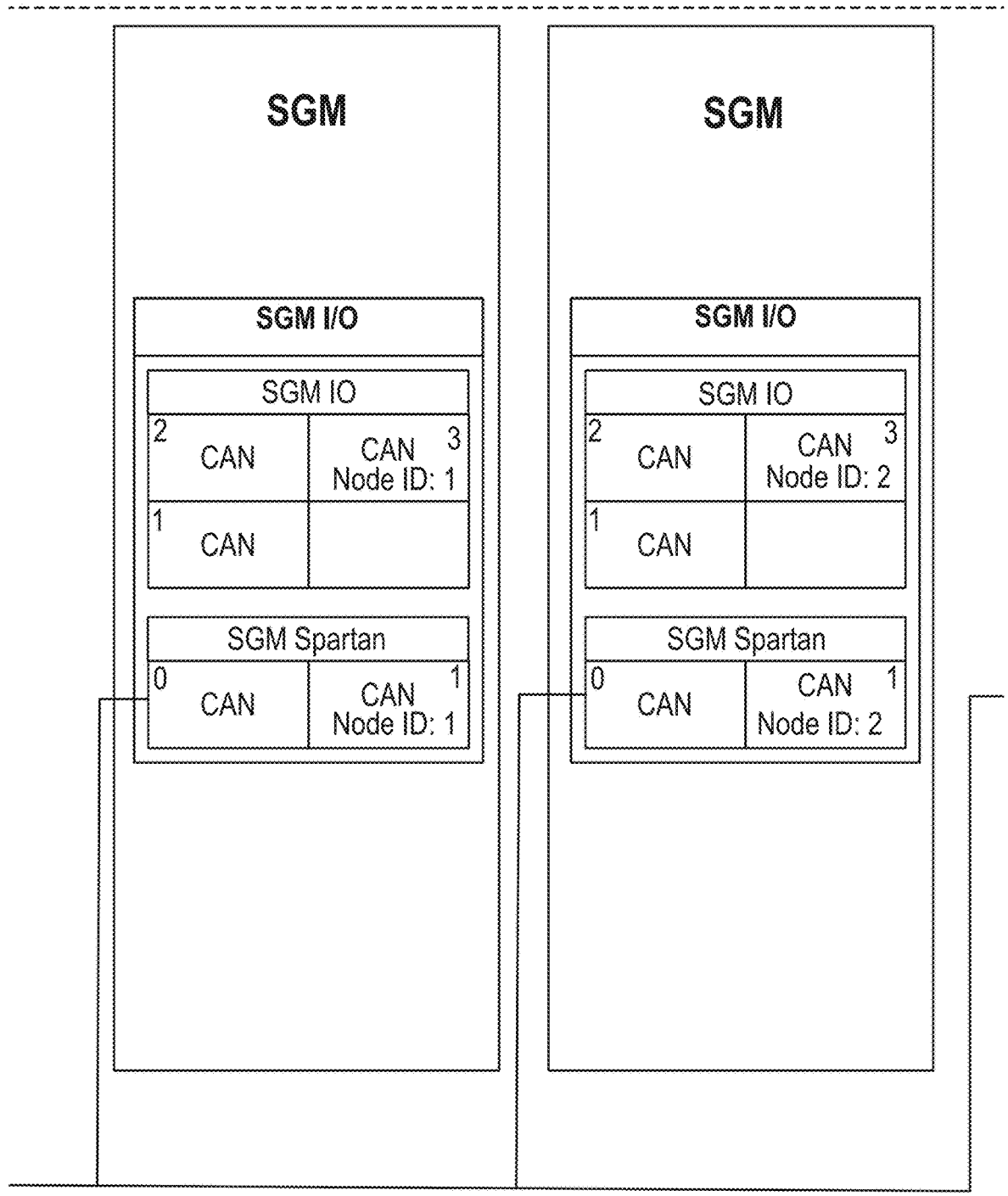
Figure 4K:
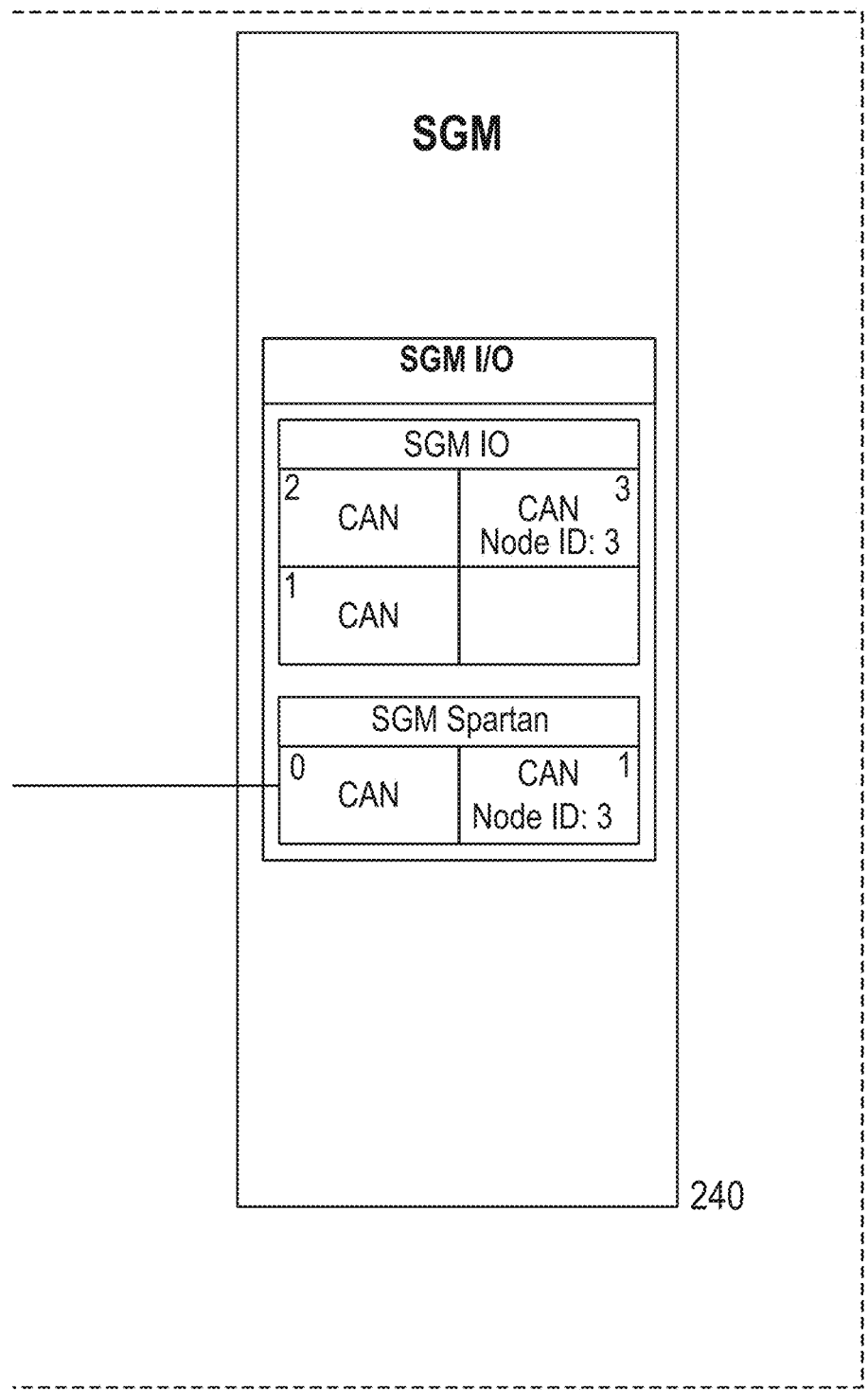

FIG. 3 illustrates a large site (e.g., a 10-megawatt system) electrolyzer system 300 according to an example embodiment of the present invention. As illustrated in FIG. 3, electrolyzer system 300 includes a plurality of stamps 310, 320, 330, 340, 350, 360, and 370. In addition, electrolyzer system 700 further includes additional balance of plant components, such as water source BOP1, hydrogen product collectors BOP2 (e.g., including piping 261), and hydrogen compression and processing BOP3. Hydrogen compression and processing BOP3 is functionally configured to supply hydrogen at pressure to the gas distribution module (e.g., GDM 250) of each respective stamp 310, 320, 330, 340, 350, 360, and 370. Thus, the stamp architecture can be repeated in a large site layout, using the repeated elements to build up to a large site installation.

FIGS. 4A-4K illustrate a large site electrolyzer system 400 according to an example embodiment of the present invention. The components of electrolyzer system 400 are similar to electrolyzer systems 200 and 300, and the differences and/or additional features will now be described. In particular, FIG. 4 illustrates the various communicatively coupled (e.g., Ethernet, Internet, hard-wired, etc.) controllers in electrolyzer system 400.

In the various embodiments of the present invention, various systems, devices, methods, and non-transitory computer readable instructions are provided for customers to operate the SOEC site and system. For example, a centralized controller (e.g., an embedded controller) is provided to receive commands from the customer at different system levels (e.g., a site level safety controller, a site level controller, a stamp level controller, a modular block controller, a power module controller, a generator module controller). Varying decisions are made at each level to reduce the data traffic on a communication bus between components of electrolyzer system 400.

For example, a site level controller. If there are multiple telemetry cabinets (TCs) at each site, the site level controller can be configured to communicate to the controller inside each telemetry cabinet. In another configuration, if there is a single telemetry cabinet at the site, then the controller inside the telemetry cabinet can be configured as the site level controller.

The site level controller can be configured to be the controller that receives the customer commands and communicates to the IO boards that monitor the safety signals. The site level controller can be connected to the site level safety controller. Additionally, the site level controller can be connected to the utility (e.g., power supplier) to receive commands on available power and interlocks.

In the various configurations, the site level controller can be configured to execute a variety of functions, including the determination of: available power at site level; hydrogen generation demand at site level; calculated available power for each stamp; calculated hydrogen generation demand for each stamp; site level safety signals; deionized ("DI") skid water quality signal; energy meter power readback at site level; energy meter power totalizer readback at site level; power readback at each and/or all stamps; calculated power readback at site level; water/steam temperature and pressure readback at site level; hydrogen temperature and pressure readback at site level; hydrogen production rate readback of all stamps; calculated hydrogen production rate readback at site level; calculated hydrogen generation efficiency (kWhr/kg) at site level; collected alarms summary of each and/or all stamps; requested actions for each and/or all stamps, etc.

For example, a stamp level controller. Each of the controllers at the modular blocks (e.g., modular blocks 210, 220, 230, 240) are communicatively and functionally coupled so as to report to one controller at stamp level. The stamp level controller can be configured to collect various data (e.g., as enumerated above) from each modular controller, and further configured to report back to the site level controller or telemetry controller.

Here, the stamp level controller is configured to link communication between the stamp level compression system and each modular block. In other words, the stamp level controller functions as the gateway to pass alarms and/or other data from the site level and compression skid to each modular block controller and back from modular block controller to site level controller and compression skid.

In the event that the stamp level controller becomes communicatively disconnected from the network or is removed for the design, the controller in the telemetry cabinet can be configured to implement the functionality of the stamp level controller.

In the various configurations, the stamp level controller can be configured to execute a variety of functions, including the determination of: calculated available power for each and/or all modular blocks; calculated hydrogen generation demand for each and/or all modular blocks; power readback of each and/or all modular blocks; calculated power readback at stamp level; water/steam temperature and pressure readback at stamp level; hydrogen temperature and pressure readback at stamp level; hydrogen production rate readback of each and/or all modular blocks; calculated hydrogen production rate readback at stamp level; calculated hydrogen generation efficiency (kWhr/kg) at stamp level; collected alarms summary of each and/or all modular blocks; requested actions for each and/or all modular blocks, etc.

In the various configurations, the modular block controller (and the power module controller) can be configured to monitor the generator modules in one module. In addition, the modular block controller (and the power module controller) can be configured to be the gateway for all the safety alarms from/to the generator modules. The modular block controller (and power module controller) can be configured to execute a variety of functions, including the determination of: calculated available power for each and/or all generator modules; calculated hydrogen generation demand for each and/or all generator modules; power readback of each and/or all generator modules; calculated power readback at modular block level; water/steam temperature and pressure readback at modular block level; hydrogen temperature and pressure readback at modular block level; hydrogen production rate readback of each and/or all generator modules; calculated hydrogen production rate readback at modular block level; calculated hydrogen generation efficiency (kWhr/kg) at modular block level; collected alarms summary of each and/or all generator modules; requested actions for each and/or all generator modules, etc.

For example, generator module controller. The generator module controller is configured to monitor the sensors in respective generator modules and executing functionality based on commands received from the operator and/or the upper level controllers. The generator module controller is communicatively and functionally coupled to the modular block controller. For example, generator module is configured to report back the critical data needed to modular block controller.

In the various configurations, the generator module controller can be configured to execute a variety of functions, including the determination of: power readback; hydrogen production rate readback; water/steam temperature and pressure readback; hydrogen temperature and pressure readback; hydrogen production rate readback; calculated hydrogen generation efficiency (kWhr/kg); alarms summary, etc.

Figure 5:
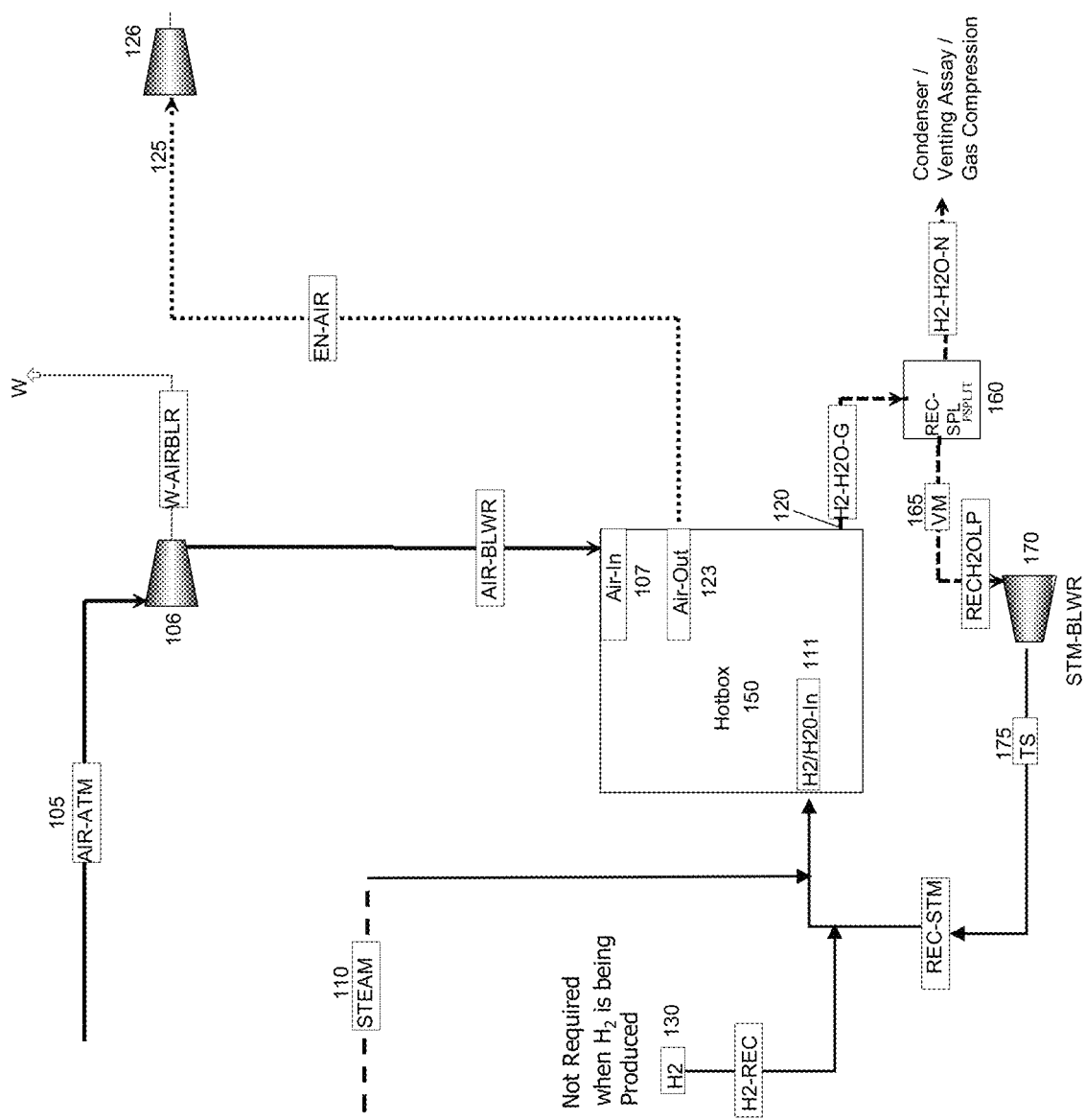
FIG. 5 is an SOEC system according to an example embodiment of the present invention.

FIG. 5 is an SOEC system 500 according to an example embodiment of the present invention.

As illustrated in FIG. 1, SOEC system 500 includes air conduit 105, air blower 106, air inlet 107, steam conduit 110, recycle steam inlet 111, hotbox 150, optional hydrogen conduit 130, enriched air outlet 123, enriched air conduit 125, enriched air blower 126, steam and hydrogen product outlet 120, splitter 160, Venturi flow meter 165, steam recycle blower 170, and thermal sensor 175.

According to an example configuration and operation, steam input at steam conduit 110 (e.g., supplying site or facility steam at varying pressures) can have a temperature of between about 100° C. and 110° C. (e.g., 105° C.) and a pressure of about 1 psig. In the various embodiments, steam may be input to the SOEC system 500 from an external source or may be generated locally. In some embodiments, multiple steam inlets may be configured to receive external and local steam, respectively. Alternatively, or additionally, water may be input to the SOEC system 500 and vaporized.

Air input (e.g., ambient air) at air conduit 105 may be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature. Air input of air conduit 105 is then received at air inlet 107 of hotbox 150.

Hydrogen from optional hydrogen conduit 130 may only be required for startup and transients when hydrogen is not being otherwise produced by SOEC system 500. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$-$H_2O$-G at steam and hydrogen product outlet 120 of hotbox 150, where G stands for Gross. Hotbox output $H_2$-$H_2O$-G may have a temperature between about 500° C. and 180° C. (e.g., 130° C.), a pressure of between about 0.1 and 0.5 psig.

In addition, hotbox output $H_2$-$H_2O$-G is input to splitter 160 and is split into a steam recycle stream RECH2OLP, where LP stands for low pressure, and a net product H2-H2O—N, where N stands for Net (e.g., output for commercial use or storage). Here, net product H2-H2O—N may have a temperature between about 100° C. and 180° C. (e.g., 130° C.), a pressure of between about 0.1 psig and 0.5 psig. Steam recycle stream RECH2OLP may have a temperature of between about 100° C. and 180° C. (e.g., 130° C.), a pressure of between about 0.1 psig and 0.5 psig. Hotbox 150 may further output enriched air at enriched air outlet 123 via enriched air conduit 125 that may have a temperature of between about 120° C. and 300° C., at essentially local atmospheric pressure (e.g., less than 0.5 psig or less than 0.05 psig).

Steam recycle stream RECH2OLP is input to steam recycle blower 170. The resulting recycled steam REC-STM may have a temperature of between about 100° C. and 180° C. (e.g., 140° C., 154° C.), a pressure between about 0.5 and 1.5 psig (e.g., about 1 psig), and is input into hotbox 150 at recycle steam inlet 111. In some embodiments, there may be no recycled hydrogen feed included with the recycled steam.

As can be understood from FIG. 1, incoming steam temperature at steam conduit 110 (e.g., 105° C.) is low compared with a SOEC configuration with internal steam generation. In various configurations, a plurality of recycle loops can be configured to SOEC systems using both internal steam generation and external steam generation. As shown, recycle steam inlet 111 is configured to receive steam from steam conduit 110. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., −280° C.) to further heat (i.e., superheat) the steam supply before the heat is released at enriched air conduit 125 through optional fan or enriched air blower 126.

In some embodiments, a customer is enabled to control the solid oxide electrolyzer cell (SOEC) system. One or more interfaces provide a custom communications protocol (e.g., via Ethernet, Internet, hard-wired, etc.) to receive and execute customer commands to operate the different states of the SOEC. Accordingly, the embodiments provide support to meet the customer needs for utilizing renewable hydrogen while guaranteeing a safe operation of the SOEC.

For example, the embodiments enable the customer or other third parties to control the SOEC system using parameters such as hydrogen generation, power limitations, and steam available. In some embodiments, a system is provided that is able to go to a safe standby state in case of communication loss. Further, a safe standby state can be defined based on conditions as agreed with the customer.

Additionally, or alternatively, the embodiments provide one or more mechanisms the for customer to operate the SOEC system, provide safety logic to remain within safety limits of the operation, guarantee that hydrogen generation meets the customer needs, by means of enabling hydrogen production ramping. In some instances, the customer can receive advanced notice of upcoming site limitations (e.g., external hydrogen not available, available power schedule, limited communication to power storage, water and input hydrogen storage limitations, etc.). Accordingly, the customer can adjust to such limitations (e.g., adjust hydrogen generation based on hydrogen usage or hydrogen storage limitations at the site).

The amount of hydrogen being produced by SOEC system 500 depends on the power imported from the grid or external power supply, the available water and/or steam source, and the number of cells in the system.

Once the SOEC system 500 is powered, an embedded controller can be configured to show that the system is Ready to Start. In this state, a customer can send a Start command to start the heat up process. From this point on, the SOEC system 500 internally manages its subsystems.

Once the heat up process has ended, the state automatically transitions to Ready to Produce H2. In this state, a customer can send a Clear to Produce H2 command if their internal safety needs are met. The SOEC controller also checks for any safety issue that could impede transition into H2 Production state.

In H2 Production state, the H2 Production Rate can be commanded. Internally, the SOEC performs the following calculation Target H2 Production=min(Allowed H2 Production Rate, Customer H2 Production Rate), to guarantee that the Target H2 Production Rate meets the requirements, based on the available power and water/steam inputs. The Allowed H2 Production Rate is calculated as follows:

Allowed H2 Production Rate=function (Available Power, Available Steam Flow, Available Fresh H2).

If a safety alarm detects that the required water/steam source is not available, the SOEC system 500 transitions into a Hot Standby state, where it can remain at temperature but it will not allow the customer to generate hydrogen. However, if the issue is resolved, the SOEC system 500 can be set back to previous state (e.g., H2 Production, Heat Up state).

Regarding alarms, the SOEC system integrates a wide set of safety and operational alarms that can bring the system to a safe Stop state if one is triggered. The customer then has the capability to clear the alarms through a Clear Alarms command and restart the SOEC system 500.

Finally, if a customer deems it desirable to cool down the system, this can be achieved through a Controlled Shutdown command, which will bring the SOEC system 500 to Controlled Shutdown state.

In the event of a communication loss between the customer and the SOEC system 500, the internal logic holds the latest commands available. This guarantees that the system can continue to operate safely based on the last command sent from a customer. Once communication losses are detected, the system can also be set back to master mode, allowing the SOEC operators to bring the system back to the desired state.

The capability of enabling customers to operate the system based on their product needs alleviates issues regarding hydrogen supply availability. The embodiments of the invention provide a communication interface to send commands to the SOEC and a closed-loop system to transition the system through different operating modes while guaranteeing safety.

The main function of the SOEC is to use electricity to break water molecules into hydrogen and oxygen through an electrolysis process. The hydrogen gas can then be captured and use for multiple applications, such as injection into natural gas pipelines, hydrogen-powered cars, and long term storage, among others.

In each of the various embodiments described herein, one or more sensors or detectors can be used to detect a safety event. For example, one or more pressure detectors and one or more thermal detectors can be used. One or more pressure detectors can be placed along input hydrogen conduits to detect under pressure (e.g., under 5 PSI) and excess pressure. If a pressure detector is tripped, the system (i.e., hotbox 150) is shutdown. Additionally, one or more thermal detectors can be placed within the cabinet of the hotbox to detect excess heat (e.g., over 230° C.). Cabinet ventilation is provided and maintained by enriched air blower 126, for example. If a thermal detector is tripped, the system (i.e., hotbox 150) is shutdown.

The SOEC system (e.g., 100) ceases receiving hydrogen when the SOEC system is operating at steady state or upon detection of a safety event. Additionally, the stack of electrolyzer cells in hotbox 150 can be configured to receive hydrogen when the SOEC system is in startup, shutdown, or when the SOEC system is not producing hydrogen.

It will be apparent to those skilled in the art that various modifications and variations can be made in the control for electrolyzer system of the present invention without departing from the spirit or scope of the invention. Thus, it is intended that the present invention cover the modifications and variations of this invention provided they come within the scope of the appended claims and their equivalents.

What is claimed is:

1. An electrolyzer system, comprising:
   stamps that each comprise a grouping of modular blocks, each of the modular blocks comprising:
      electrolyzer modules that each comprise an electrolyzer stack comprising a plurality of solid oxide electrolyzer cells configured to receive steam in combination with hydrogen, a steam recycle outlet configured to recycle a portion of the steam, and an electrolyzer module controller; and
      a power module comprising a power converter configured to provide power to the electrolyzer modules and a power module controller configured to control the electrolyzer module controllers;
   stamp level controllers configured to control the power module controllers of a corresponding stamp; and
   a site level controller configured to control the stamp level controllers and to calculate a stamp level hydrogen generation demand for each stamp based on a received site level hydrogen requirement,
   wherein:
   each of the stamp level controllers is configured to calculate a block level hydrogen generation demand for each modular block of a corresponding stamp, based on the stamp level hydrogen generation demand received from the site level controller; and
   each of the power module controllers is configured to calculate an electrolyzer level hydrogen generation demand for each electrolyzer module of a corresponding modular block, based on the block level hydrogen generation demand received from the corresponding stamp level controller.

2. The electrolyzer system of claim 1, further comprising a hydrogen compression and processing system.

3. The electrolyzer system of claim 2, wherein the site level controller is further configured to control the hydrogen compression and processing system.

4. The electrolyzer system of claim 3, wherein the site level controller is configured to control the stamp level controllers and the hydrogen compression and processing system based on at least one of received customer commands, power availability data, or system safety signal.

5. The electrolyzer system of claim 1, wherein: each of the electrolyzer module controllers is configured to control a corresponding electrolyzer stack to generate an amount of hydrogen according to the electrolyzer level hydrogen demand received from a corresponding power module controller.

6. The electrolyzer system of claim 1, wherein:
   the electrolyzer module controllers are configured to output electrolyzer module alarm signals to the corresponding power module controllers;
   the power module controllers are configured to output a summary of received electrolyzer module alarm signals to the corresponding stamp level controllers; and
   the stamp level controllers are configured to output alarm summaries received from the power module controllers to the site controller.

7. The electrolyzer system of claim 1, wherein the power module controllers, the stamp level controllers, and the site level controller are connected to each other via Ethernet.

8. The electrolyzer system of claim 1, wherein each stamp further comprises a gas distribution module configured to provide hydrogen to the electrolyzer modules during system startup.

9. The electrolyzer system of claim 8, wherein the gas distribution module comprises a pressure detector, a thermal detector, a gas safety shutoff, and a purge gas distributor.

10. The electrolyzer system of claim 1, wherein:
   the electrolyzer module controllers are configured to calculate module hydrogen production rates of the corresponding electrolyzer modules;
   the power module controllers are configured to calculate block level hydrogen production rates based on module hydrogen production rates received from corresponding electrolyzer module controllers;
   the stamp level controllers are configured to calculate stamp level hydrogen production rates based on module hydrogen production rates received from corresponding power module controllers; and the site level controller is configured to calculate a site level hydrogen production rate based on stamp level hydrogen production rates received from the stamp level controllers.

11. The electrolyzer system of claim 1, further comprising a site level safety controller configured to provide site safety data to the site level controller.

12. The electrolyzer system of claim 11, wherein the site level controller is configured to control the stamp level controllers based on the safety data provided by the site level safety controller.

13. The electrolyzer system of claim 1, wherein each of the modular blocks is located on a respective pad.

14. The electrolyzer system of claim 13, wherein each of the electrolyzer modules in each of the modular blocks is located in a separate cabinet on the respective pad.

15. The electrolyzer system of claim 14, wherein the power module in each of the modular blocks is located in a separate cabinet from the electrolyzer modules on the respective pad.

* * * * *